United States Patent
Koizumi et al.

[11] Patent Number: 5,909,488
[45] Date of Patent: Jun. 1, 1999

[54] COMMUNICATION APPARATUS HAVING A NON-RINGING CALL RECEIVING MODE AND AN ENERGY-SAVING STAND-BY MODE

[75] Inventors: Shigeru Koizumi, Kawasaki; Masao Kiguchi, Yokohama, both of Japan

[73] Assignee: Canon Kabushiki Kaisha, Tokyo, Japan

[21] Appl. No.: 08/699,942

[22] Filed: Aug. 20, 1996

[30] Foreign Application Priority Data

Aug. 22, 1995 [JP] Japan .................................. 7-213531
Oct. 12, 1995 [JP] Japan .................................. 7-290520

[51] Int. Cl.$^6$ ............................................... H04M 1/00
[52] U.S. Cl. ................... 379/373; 379/93.09; 379/382; 379/413; 379/418; 379/442
[58] Field of Search ............................ 379/56, 93.09, 379/100, 100.15, 201, 210, 88, 67, 100.16, 373, 375, 418, 93, 102.04, 382, 413; 358/400, 434, 442, 443, 468, 438

[56] References Cited

U.S. PATENT DOCUMENTS

| | | | |
|---|---|---|---|
| 4,837,806 | 6/1989 | Watanabe | 379/93 |
| 4,837,813 | 6/1989 | Terajima | 379/113 |
| 4,932,048 | 6/1990 | Kenmochi et al. | 379/100.16 |
| 5,146,493 | 9/1992 | Kiguchi et al. | 379/413 |
| 5,157,711 | 10/1992 | Shimanuki | 379/413 |
| 5,185,783 | 2/1993 | Takahashi et al. | 379/93.09 |
| 5,216,704 | 6/1993 | Williams et al. | 379/413 |
| 5,220,597 | 6/1993 | Horiuchi | 379/413 |
| 5,289,359 | 2/1994 | Ziermann | 379/413 |
| 5,317,629 | 5/1994 | Watanabe | 379/93 |
| 5,343,514 | 8/1994 | Snyder | 379/413 |
| 5,428,682 | 6/1995 | Apfel | 379/413 |
| 5,479,408 | 12/1995 | Will | 370/94.1 |
| 5,483,574 | 1/1996 | Yuyama | 379/413 |
| 5,526,418 | 6/1996 | Tai | 379/373 |
| 5,537,220 | 7/1996 | Ezumi et al. | 358/442 |
| 5,539,805 | 7/1996 | Bushue et al. | 379/413 |
| 5,666,355 | 9/1997 | Huah et al. | 370/311 |
| 5,673,117 | 9/1997 | Ezumi et al. | 358/400 |
| 5,706,340 | 1/1998 | Saji | 379/413 |

*Primary Examiner*—Scott Wolinsky
*Attorney, Agent, or Firm*—Fitzpatrick, Cella, Harper & Scinto

[57] ABSTRACT

A communication apparatus has a power saving stand-by mode for reducing power consumption during stand-by and a non-ringing call receiving mode for communication without ringing an attached telephone set at the arrival of a call. In the power saving stand-by mode, an operation state of a relay for attaining the non-ringing call receiving mode is held by a stand-by power supply to render both modes compatible to each other.

9 Claims, 9 Drawing Sheets

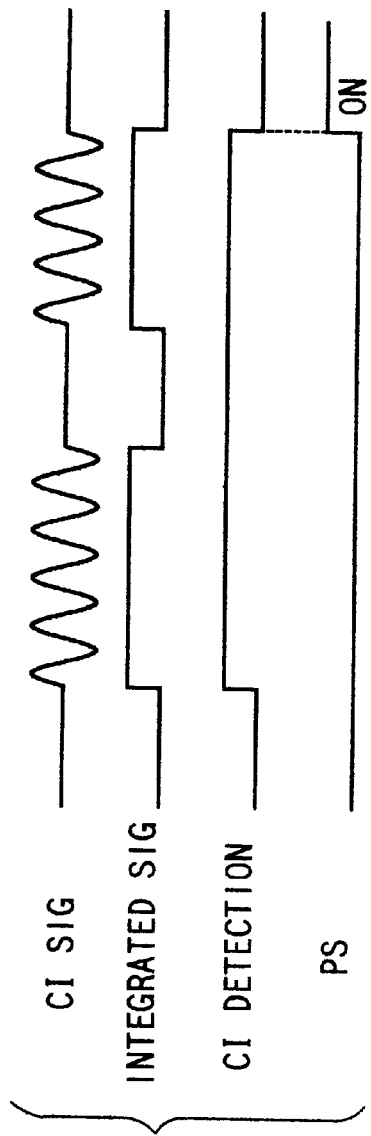
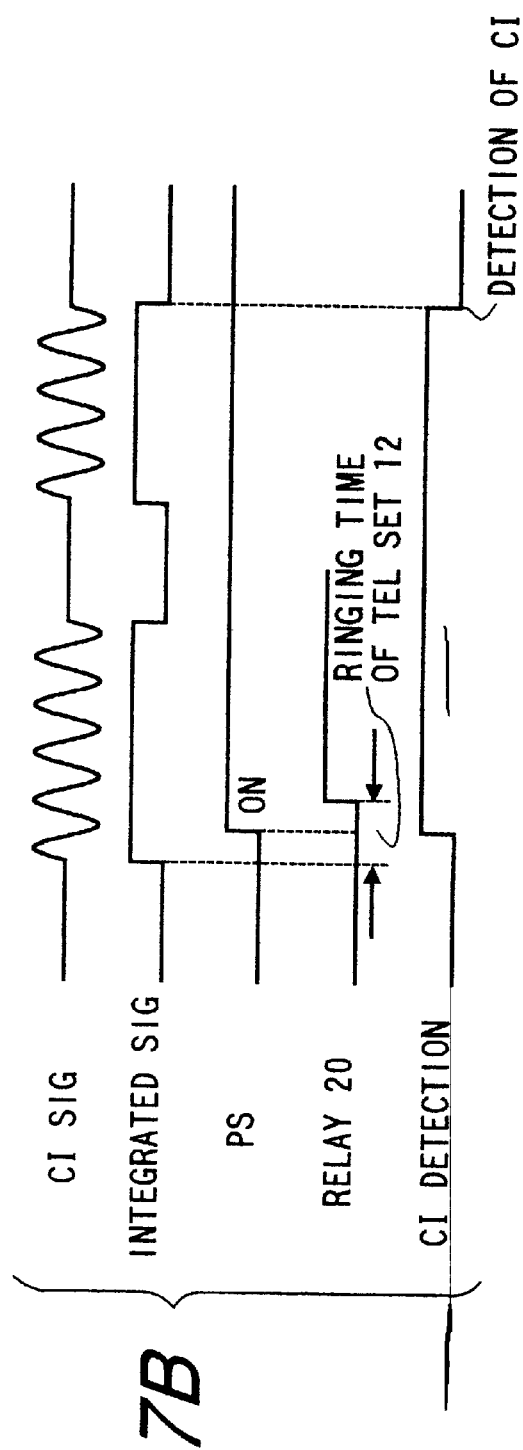
FIG. 7A
FIG. 7B

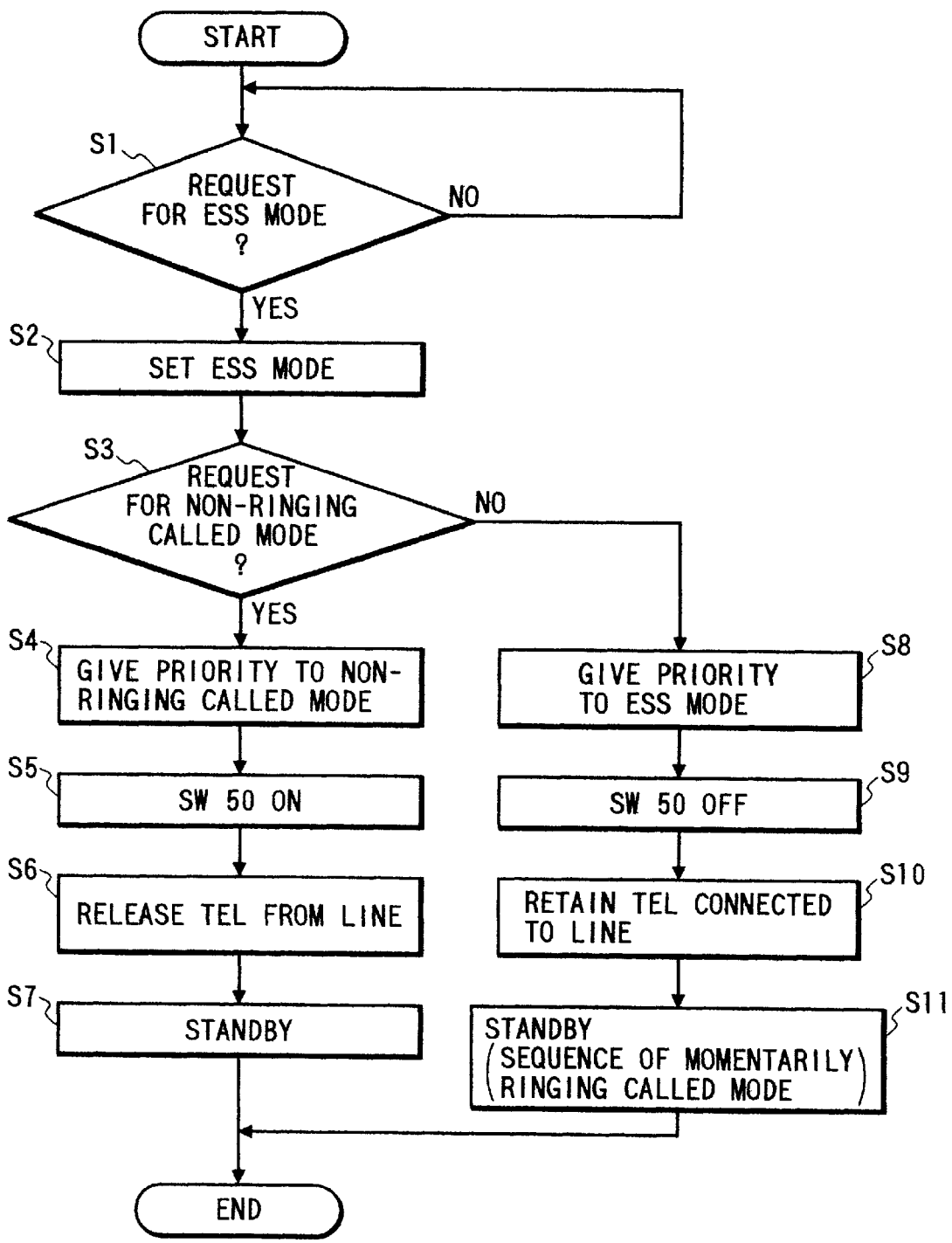

COMMUNICATION APPARATUS HAVING A NON-RINGING CALL RECEIVING MODE AND AN ENERGY-SAVING STAND-BY MODE

BACKGROUND OF THE INVENTION

1. Field of the Invention

The present invention relates to a communication apparatus having a power saving stand-by mode to reduce power consumption during stand-by and a non-ringing call receiving mode to conduct communication without ringing an associated telephone set in receiving a call.

2. Related Background Art

A prior art apparatus of this type such as a facsimile apparatus has a non-ringing call receiving function in which the apparatus automatically determines whether a received call is for image communication or telephone communication without ringing an associated telephone set when the apparatus receives a call, if it is the image communication, the apparatus starts image reception and if it is the telephone communication, the apparatus applies a simulated calling signal to the telephone set (slave telephone set) to make it ring or generates a call sound from a speaker of the image communication apparatus to inform the call to a user. Such a facsimile apparatus is disclosed in U.S. Pat. No. 4,837,806 issued on Jun. 6, 1989 and U.S. Pat. No. 5,317,629 issued on May 31, 1994.

On the other hand, regulations on the power consumption of electronic equipment have recently been issued in many countries. For image communication apparatus, regulations require reduction of power consumption while in the stand-by mode depending on a recording speed. The power saving stand-by mode which suppresses power consumption is referred to as an ESS (energy saving stand-by) mode.

In the above-mentioned facsimile apparatus which has the non-ringing call receiving mode but does not have the ESS mode, an H relay for isolating a telephone set from a line is provided between the telephone set and a CML (communication line) relay which switches the telephone line between a facsimile apparatus (modem) and the telephone set, and a power is supplied to the H relay to keep the H relay in an on-state during the stand-by. Thus, when a call signal (Cl signal) is received from the line, the Cl signal is prevented from being applied to the telephone set and a bell of the telephone set from being rung.

On the other hand, in a facsimile apparatus having the ESS mode, power is supplied only to a minimum of circuits, such as a control circuit (CPU) of a microcomputer, in order to minimize the power consumption during the stand-by and the power supply to drive the H relay is shut down during the stand-by. As a result, once the apparatus is set to the ESS mode, the H relay cannot be turned on during the stand-by and the non-ringing call receiving mode is not realized.

SUMMARY OF THE INVENTION

In light of the above problems, it is an object of the present invention to provide a communication apparatus having the power saving stand-by mode and the non-ringing call receiving mode.

It is another object of the present invention to minimize the power consumption during the stand-by in the non-ringing call receiving mode to make the non-ringing call receiving mode compatible with the power saving stand-by mode.

It is still another object of the present invention to prevent the associated telephone set from ringing as much as possible in the power saving standby mode.

It is still another object of the present invention to enable selection of a non-ringing call receiving process having the prioritized power saving stand-by mode and a power-saving stand-by process having the prioritized non-ringing call receiving mode.

Other object of the present invention will be apparent from the following detailed description of the embodiments and the accompanying drawings.

BRIEF DESCRIPTION OF THE DRAWINGS

FIG. 7A shows a timing chart at the reception of a call in a normal ringing call receiving mode.

FIG. 7B shows a timing chart at the reception of a call in a low ringing call receiving mode, and FIG. 8 shows a flow chart of a control operation of the CPU 1 in a second embodiment.

DETAILED DESCRIPTION OF THE PREFERRED EMBODIMENTS

The embodiments of the present invention will be explained in detail with reference to the drawings.

Figure 1:
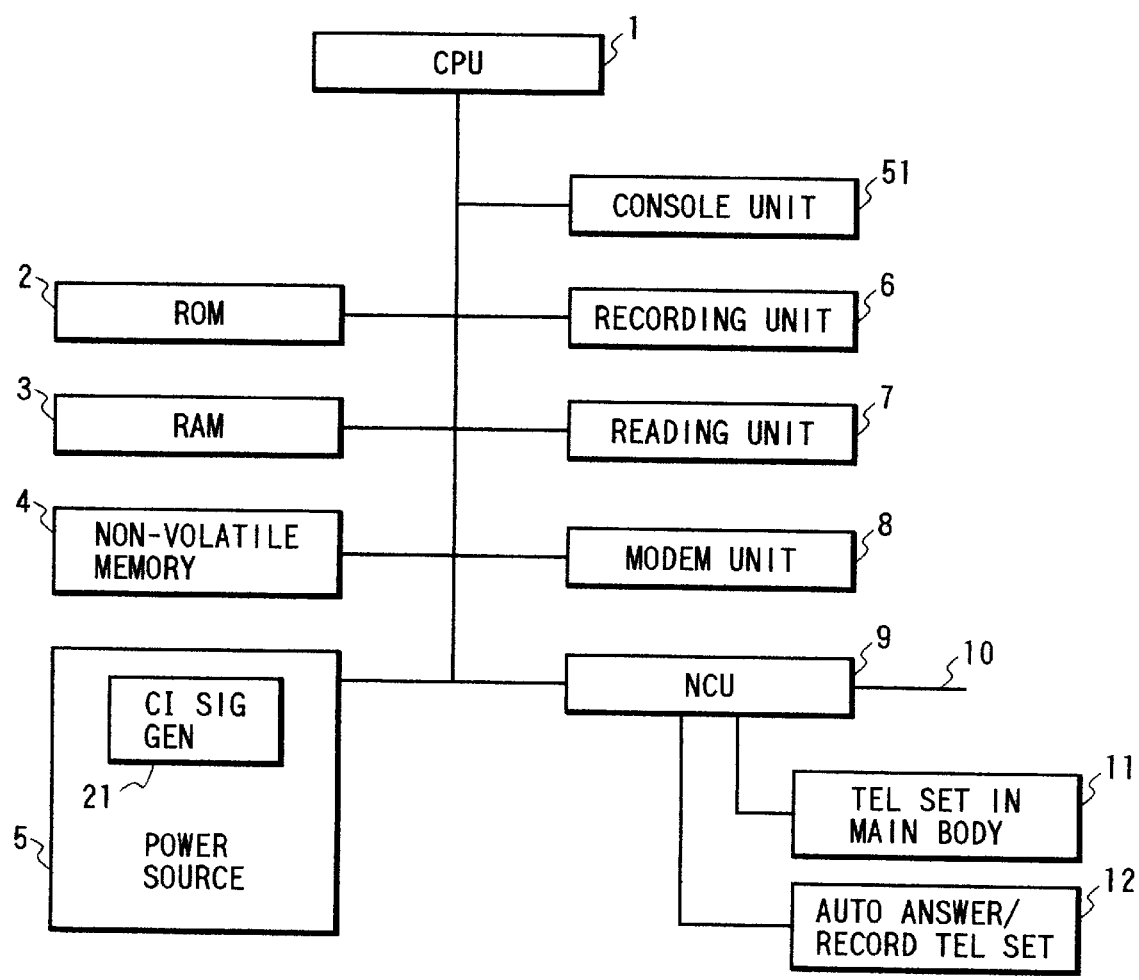
FIG. 1 shows a block diagram of a configuration of a facsimile apparatus in accordance with an embodiment.

FIG. 1 shows a block diagram of a configuration of a facsimile apparatus in accordance with a first embodiment of the present invention.

A CPU 1 controls an entire communication apparatus (facsimile apparatus) in accordance with a program stored in a ROM 2 and comprises a microcomputer.

A non-volatile memory 4 stores data to be reserved even after the shut-down of a power supply 5 of the communication apparatus.

The power supply 5 may control the on/off of an output by the CPU 1 under remote control. The power supply 5 also has a quasi-call sound signal generator 21.

A recorder 6 reads out recorded data stored in the RAM 3 under control of the CPU 1 and prints it out as a hard copy.

A reader 7 binarizes the data read by a CCD under control of the CPU 1 and sequentially sends the binarized data to the RAM 3.

A modem 8 comprises G3 and G2 modems and a clock generator connected thereto, and modulates transmission data stored in the RAM 3 and outputs it to a telephone line 10 through an NCU (network control unit) 9 under control of the CPU 1. The modem 8 also receives an analog signal on the telephone line 10, demodulates it and stores the binarized data in the RAM 3.

The NCU 9 selectively connects the telephone line to the modem 8, a telephone set 11 of the main unit or an automatic answer/record telephone set 12 under control of the CPU 1.

The power supply 5 comprises a main power supply and a stand-by power supply which may be remotely on/off controlled. The stand-by power supply is normally on upon turn-on of a power switch.

The stand-by power is supplied to peripheral circuits of the CPU 1 including the CPU 1, such as the CPU 1, the ROM 2, the RAM 3, the non-volatile memory 4, the modem 8 and the NCU 9. The main power is supplied to those units which can be readily electrically separated from the system and are not required during the stand-by mode such as logics of the recorder and the reader and a stepping motor.

Console 51 is provided for use by an operator inputting commands and the like.

Figure 4:
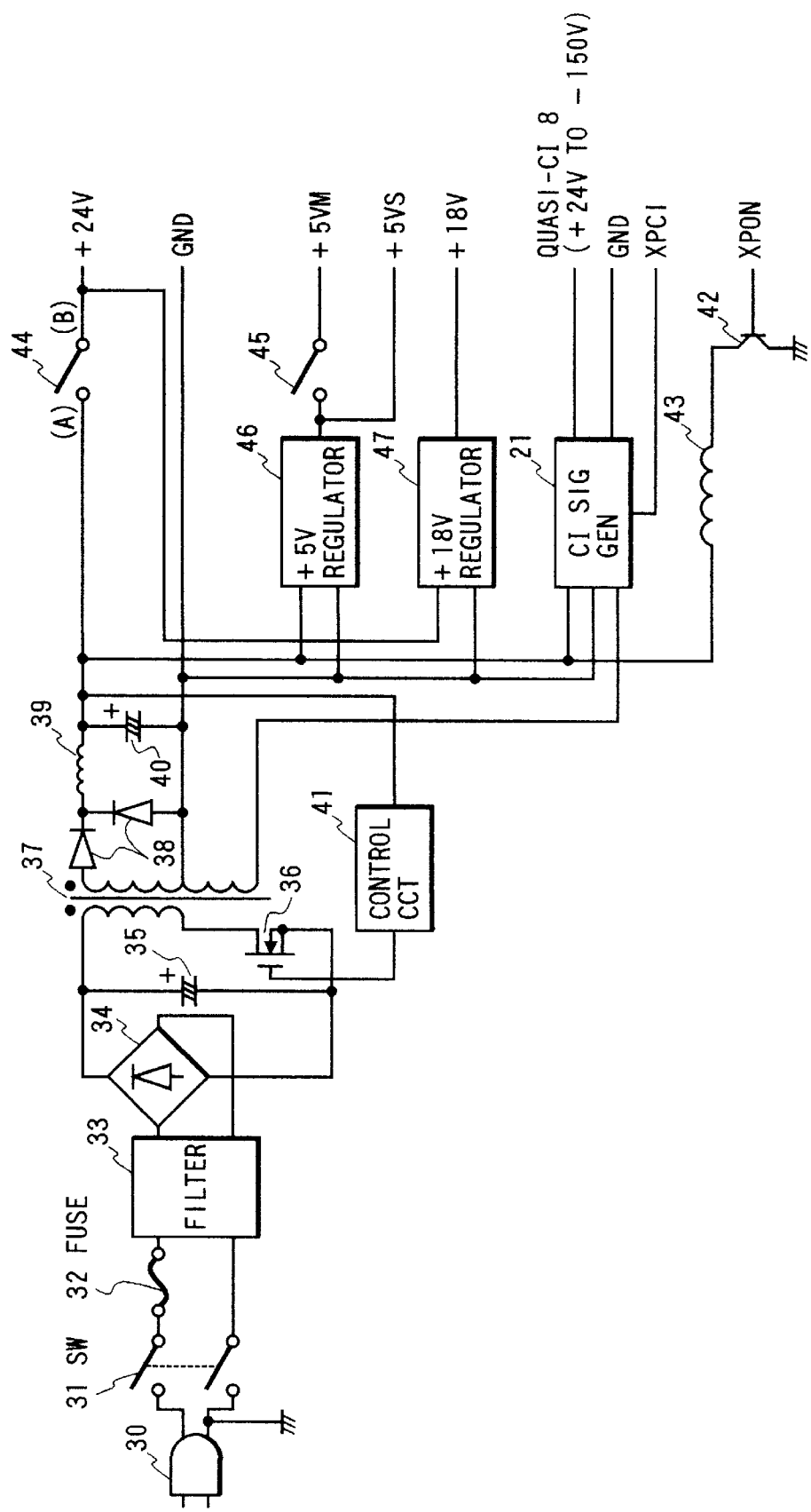
FIG. 4 shows a block diagram of a detailed configuration of a power supply.
Figure 5:
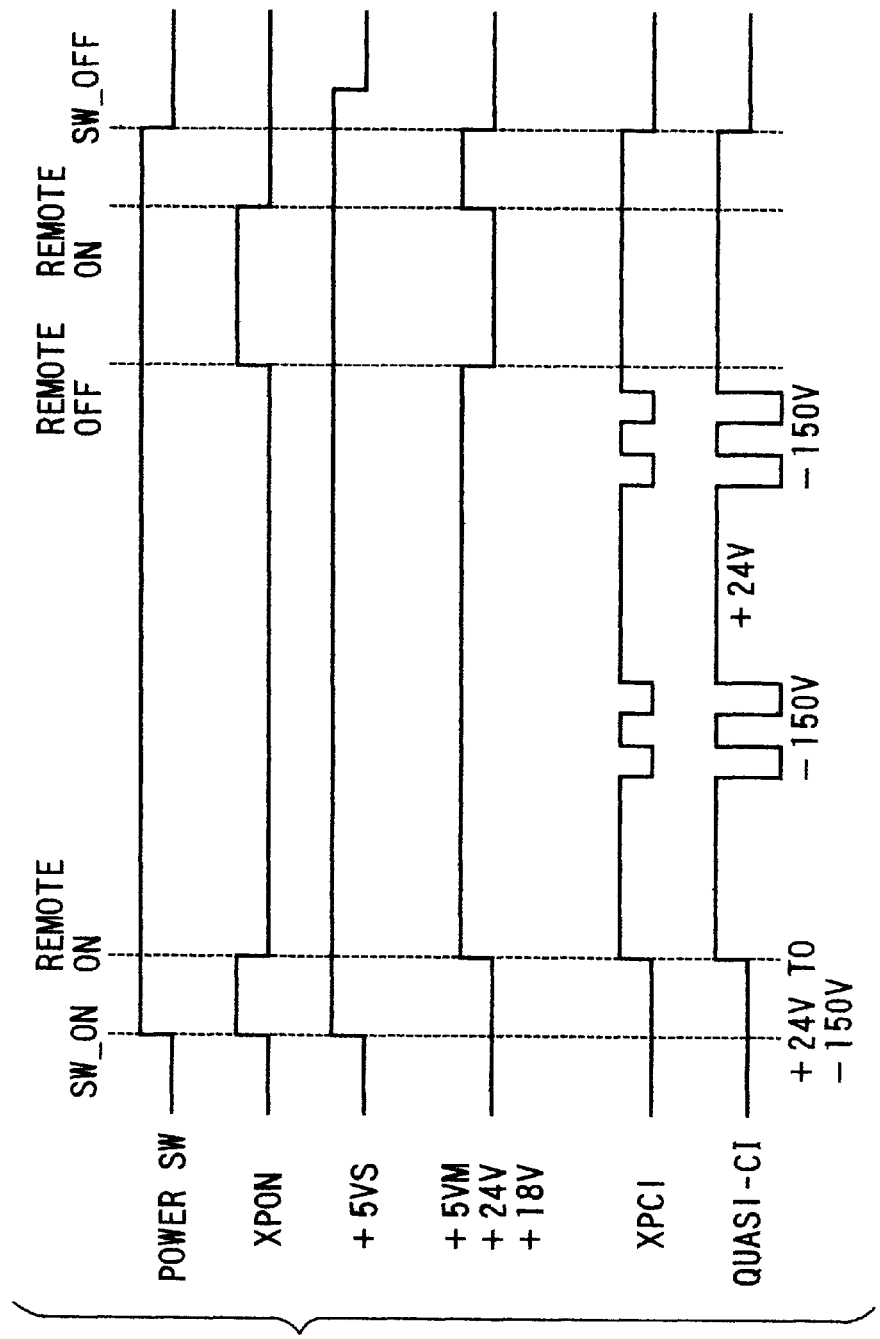
FIG. 5 shows a timing chart of remote control of the power supply.

FIG. 4 shows a detailed configuration of the power supply 5. In FIG. 5, +5VS and +18V denote the stand-by power supply and +5VM, +24V and quasi CI (+24V to −150V) denote the main power supply.

A function of the power supply is summarized below.

| Channel | Function |
| --- | --- |
| +5 VS | Normally output upon SW-on |
| +5 VM | Remotely on/off controllable |
| +18 V | Normally output upon SW-on |
| +24 V | Remotely on/off controllable |
| Quasi CI | +24 V output when remote mode is off. Quasi CI output by XPCI in remote mode |

In FIG. 4, numeral 30 denotes an AC input plug, numeral 31 denotes a power switch SW, numeral 32 denotes a fuse FUSE, numeral 33 denotes a filter, numeral 34 denotes a diode bridge, numerals 35 and 40 denote electrolyte capacitors, numeral 36 denotes a switching power FET (field effect transistor), numeral 37 denotes a transformer, numeral 38 denotes a diode, numeral 39 denotes a choke coil, numeral 41 denotes a switching power supply control circuit, numeral 42 denotes a relay driver, numeral 43 denotes a coil of a relay, numeral 44 denotes a contact of the relay, numeral 45 denotes a contact of the relay, numeral 46 denotes a 5V regulator and numeral 47 denotes a 18V regulator.

The power supply 5 generates power for the present communication apparatus and is designed to produce a DC output for an AC 100V input (primary winding) upon turn-on of the power switch. The power supply 5 also activates the automatic answer/record telephone set 12 and generates a quasi call signal for the calling signal to ring the main unit telephone set 11. The DC voltage of the power supply 5 is controlled by controlling a remote signal (XPON) by the CPU 1.

Referring to FIG. 5 in addition to FIG. 4, at the turn-on of the power supply, only +5VS is up. At the remote ON, +5VM, +18F, +24V and quasi CI are up. The remote is off when the remote signal XPON is high and on when it is low. A call signal generator 21 outputs a quasi calling signal (quasi CI signal) to the automatic answer/record telephone set 12 and it is built in the power supply 5. When the remote signal is on (main power supply is on), the calling signal generator 21 outputs +24V if the quasi calling control signal XPCI is high and outputs −150V it is low. When the remote signal of the power supply 5 is off, namely ESS, the calling signal generator 21 outputs +24V if the quasi calling signal control signal is high and outputs 0V if it is low. In this manner, a dangerous voltage is not generated in the ESS mode.

Figure 2:
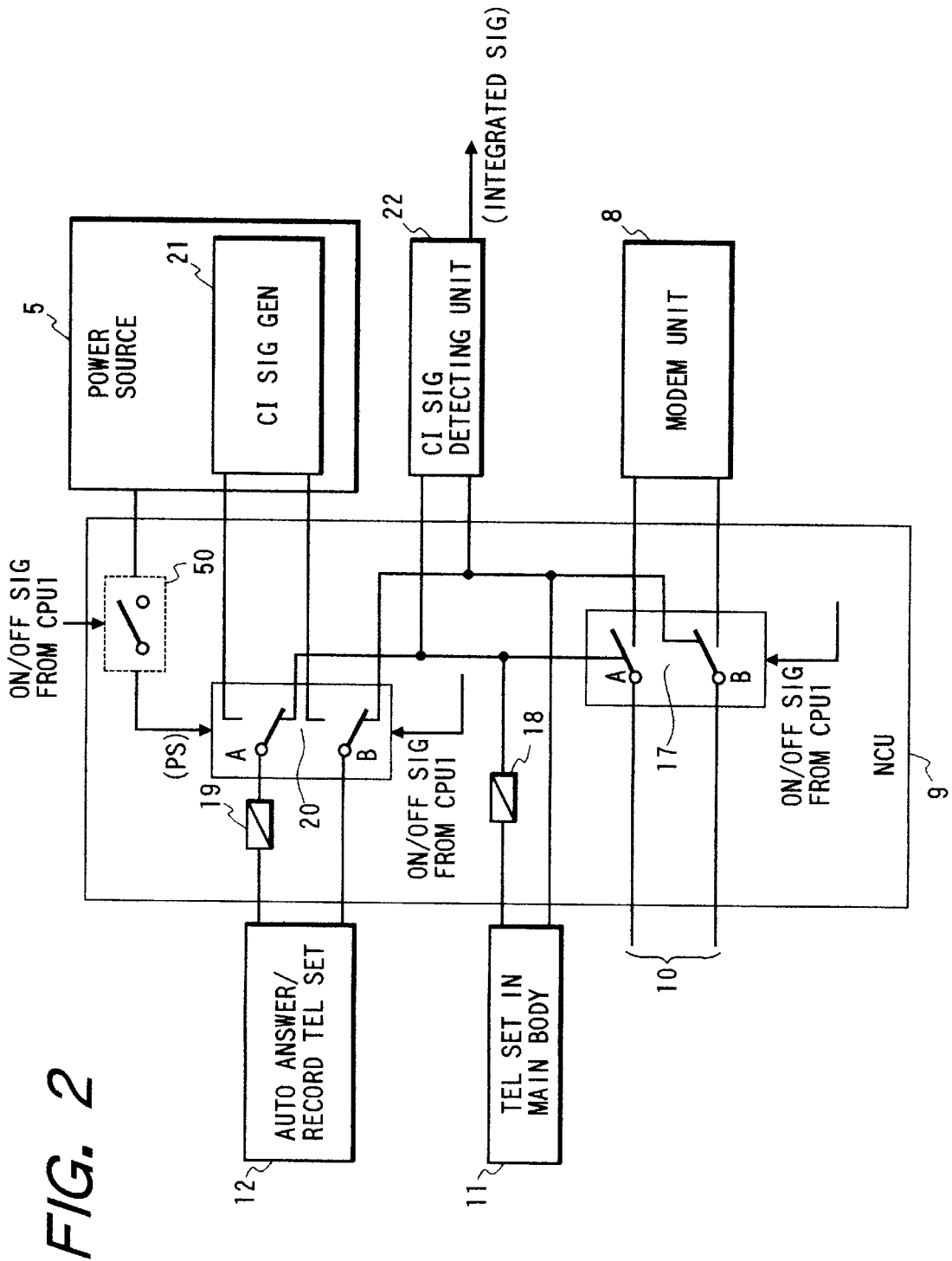
FIG. 2 shows a block diagram of a detailed configuration of an NCU.

FIG. 2 shows a block diagram of a configuration of the NCU 9. A CI detector 22 of the NCU 9 detects a calling signal from the line 10.

The NCU 9 comprises a CML relay 17 for connecting the line 10 selectively to the telephone set 11, the automatic answer/record telephone set 12 and the modem 8, an off-hook detection circuit 18 for detecting a response of the main unit telephone set 11, an off-hook detection circuit 19 for detecting a response of the automatic answer/record telephone set 12 and a K relay 20 for connecting the automatic answer/record telephone set 12 selectively to the line 10 (B) or the calling signal generator 21 (A).

The off-hook detection when the automatic answer/record telephone set 12 is connected to the line is conducted by the off-hook detection circuit 19, and the off-hook detection when the main unit telephone set 11 is connected to the line is conducted by the off-hook detection circuit 18. When the off-hook detection circuits 18 and 19 detect the hook-up of a handset, they output the off-hook signal. The CPU 1 detects the off-hook signal to determine the hook-up of the handset of the automatic answer/record telephone set 12.

On the other hand, when the calling signal is not sent, the calling signal generator 21 outputs a predetermined DC voltage (+24V in the present embodiment) as described above. The off-hook in the non-ringing call receiving mode or during the communication is conducted by applying the DC voltage to the telephone set and detecting a current flowing in the telephone set when the handset is hooked up by the off-hook detection circuit 19 inserted serially in the telephone line to detect the hook-up of the handset. Upon detection, the off-hook detection circuit outputs the off-hook signal which represents the acknowledgement of the hook-up.

The ESS (energy saving stand-by) mode and the non-ringing call receiving mode are now explained. First, a shift process to the ESS mode is explained. Normally, the selection of the stand-by mode or the ESS mode is conducted by setting a mode selection of a software switch.

It is now assumed that the software switch has been set in the non-ringing call receiving mode. In the non-ringing call receiving mode, when a call signal arrives, it is received without ringing the bell of the telephone set, and if a signal unique to image communication (for example, a CNG signal) is received, the image reception is conducted, otherwise the line 10 is connected to the telephone set 11 or 12. From the time of setting to the non-ringing call receiving mode, the switching relay 20 of the NCU 9 is connected to the quasi calling signal generator 21 (A). The quasi calling signal outputs a high level as shown in the timing chart of FIG. 5 (quasi CI).

When the software switch is set to the ESS mode, it is automatically shifted to the ESS stand-by mode if a factor to cause the activation of the system does not occur for a predetermined period after the completion of a series of operations such as transmission and reception.

The factor to cause the activation may include the arrival of the calling signal (CI), the arrival of a facsimile calling signal (FC), the arrival of a timer output signal, the detection of loading of a document sheet and the depression of a start switch (ESS switch) on a console panel (not shown).

Figure 3A:
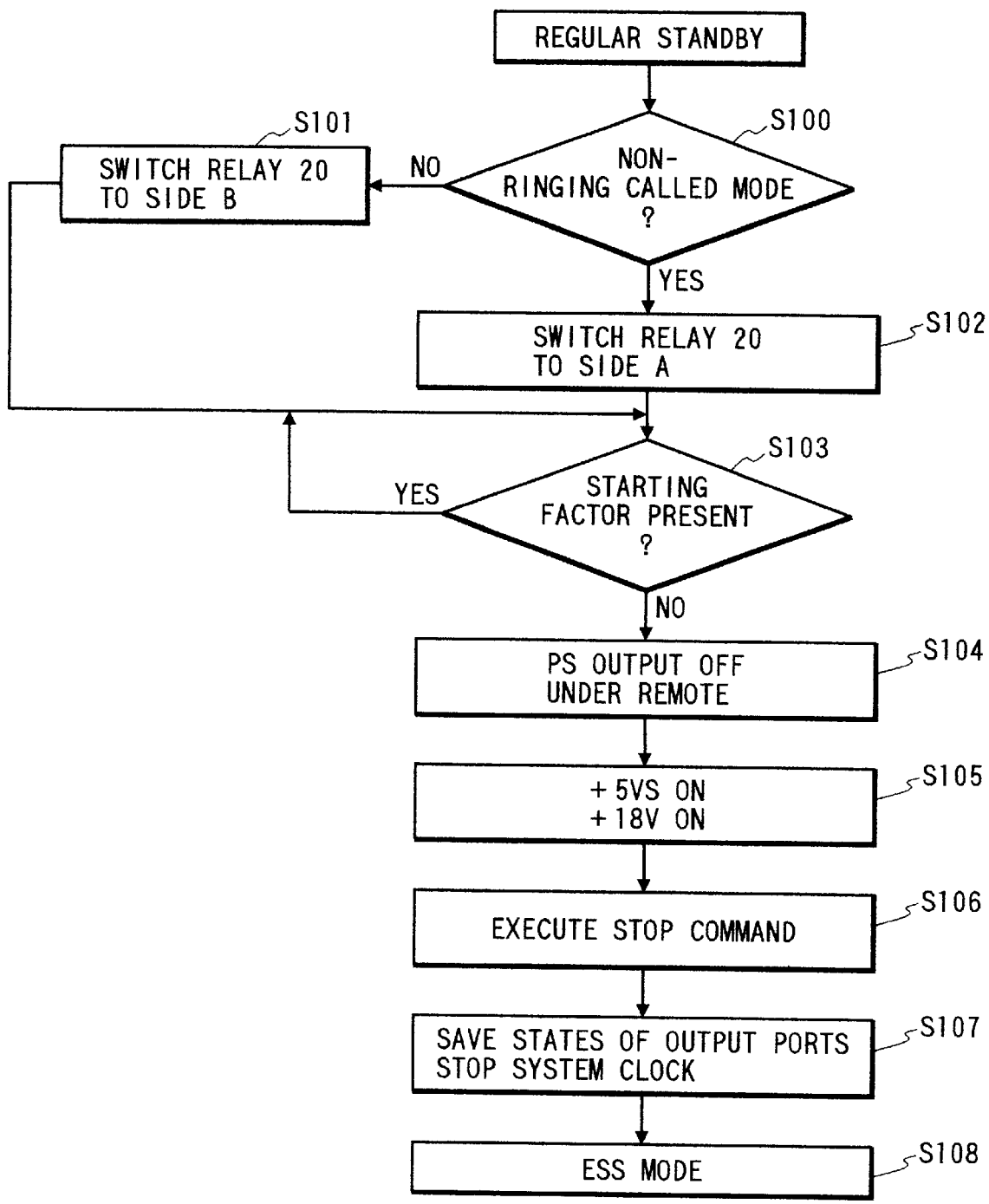
FIG. 3A shows a flow chart of a control operation of a CPU 1 in the first embodiment.

Referring to FIG. 3A, an operation in the ESS mode when the activation factor does not occur for the predetermined period is explained. The CPU 1 first recognizes the setting to the ESS mode from the setting of the software switch (S100). Depending on the result in S100, the switch relay 20 is set either to side B (S101) or to side A (S102). If the activation factor does not occur for the predetermined period (NO in S103), control to shift to the ESS stand-by is conducted (S104 to S107). The remote signal of the power supply 5 is controlled to turn off the predetermined output of the power supply 5 (S104). In this case, only +5VS (stand-by 5V) and +18V are on, and +5VM (main 5V), +24V and quasi calling signal are off (S105). The +5VS supplies powers to the peripheral circuits of the CPU 1 such as the CPU 1, the ROM 2, the RAM 3 and the non-volatile memory 4, and the relay 20 of the NCU 9. The +5VM supplies powers to the recorder 6 and the CML relay 17 of the NCU 9. The +24V supplies powers to the recorder and the motor. The +18V supplies powers to mainly analog circuits of the communication system and the reader.

Oscillation circuits other than a system clock (for example, an oscillation circuit for generating a timing signal of the reader) are stopped by control from the CPU 1. Since the modem 8 has a sleep mode, it is set to the sleep mode. The other ICs in the peripheral circuits of the CPU 1 which are supplied with +5VS and have the sleep mode are set to the sleep mode. In this manner, the power consumption during the stand-by mode is reduced.

The CPU 1 then executes a STOP command (S106). When the STOP command is executed, the system clock which is oscillated in the oscillation circuit of the CPU 1, outputted from the CPU 1 and supplied to respective control circuits is stopped (S107) and the system enters the ESS (inactive) state (energy saving stand-by mode) (S108, and S109 in FIG. 3B).

The output port which controls the remote of the relay and the power supply, and the quasi calling signal outputted from the CPU 1 or a parallel I/O is deactivated while it keeps the state prior to the execution of the STOP command (S107). A data bus and an address bus of the CPU 1 and the peripheral ICs are kept in high impedance state. The reservation of the state of the output port is realized by a configuration shown in FIG. 6.

Figure 6:
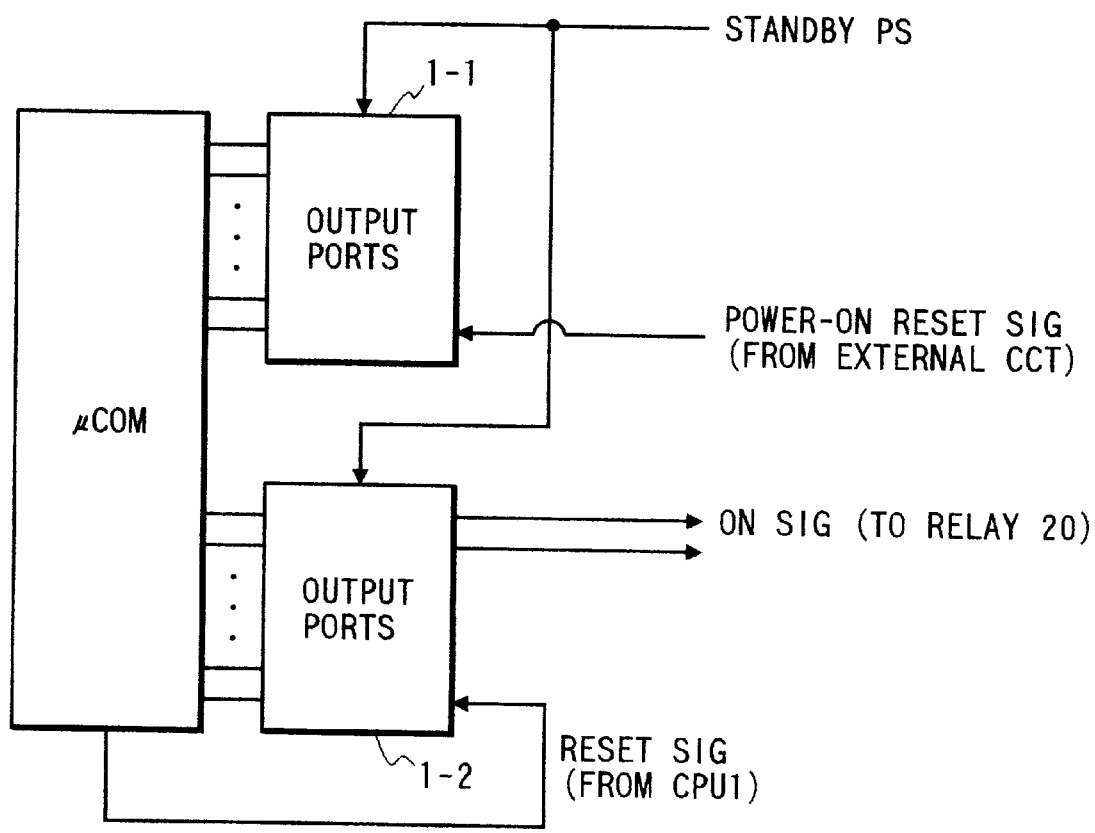
FIG. 6 shows a block diagram of a configuration for status reserving of an output port of the CPU 1 in the stand-by mode.

In FIG. 6, a reset signal comprises two channels, a power-on and a soft reset. The power-on reset (hard reset) is for power-on, and the soft reset is for controlling the on/off of the reset by software. The circuits which are to be reset upon power-on use the power-on reset, and the circuits which need the reset/non-reset control upon power-on use the soft reset. The controlling output port uses the soft reset for keeping the output state, and controls the reset upon power-on by software.

In the first embodiment, the on signal to the relay 20 is outputted from the output port 1-2, and even if the CPU 1 is in the sleep mode, the state of the output port is kept by the stand-by power supply so that the output port is not reset by the external power-on reset circuit when the main power supply is turned on.

Figure 3B:
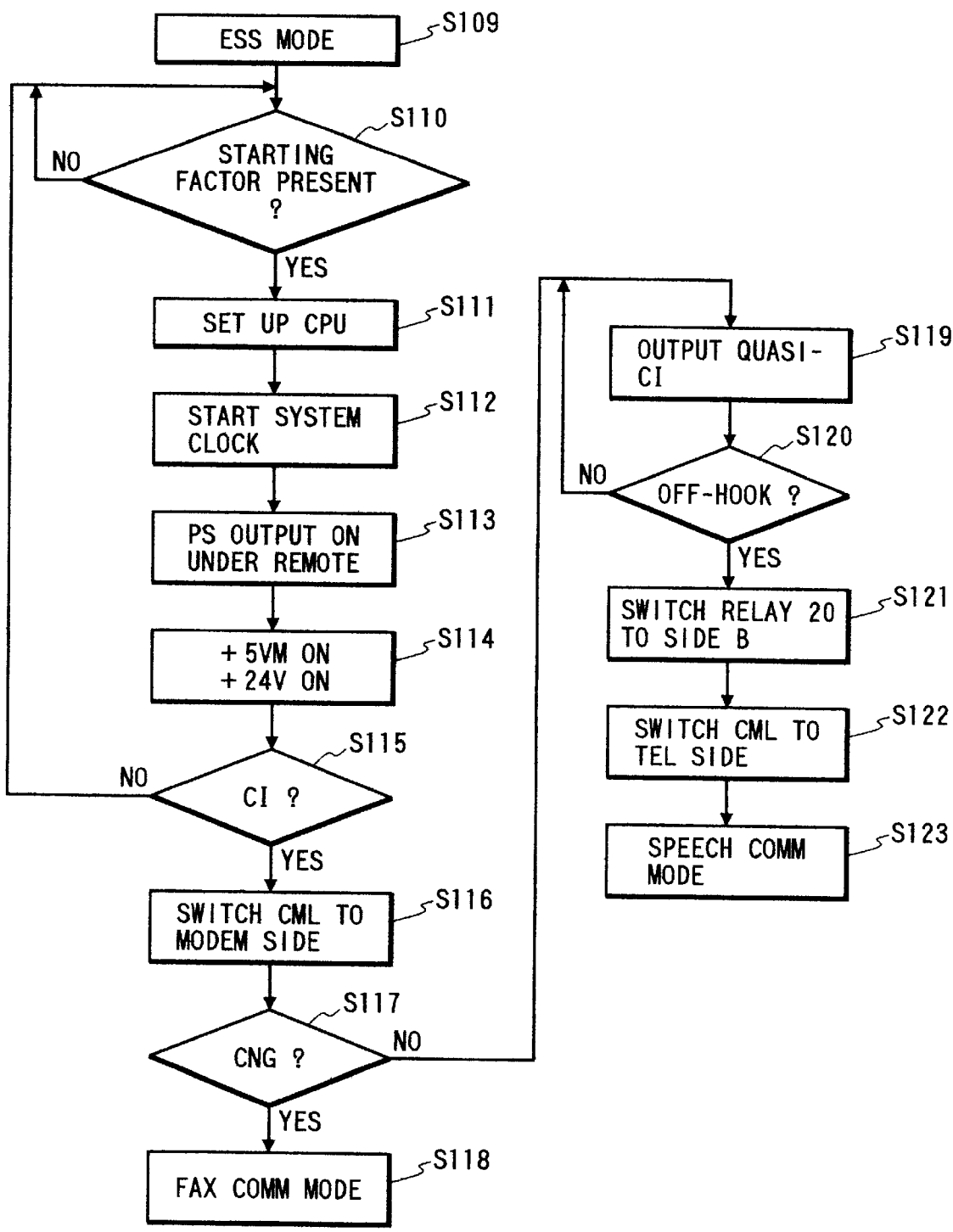
FIG. 3B shows a flow chart of a control operation of a CPU 1 in the first embodiment.

Referring to FIG. 3B, a procedure to raise from the ESS stand-by mode to the normal mode is explained. In the ESS stand-by mode, when the activation factor occurs, the power supply 5 is activated (Y in S110). The activation factor may be the calling signal (CI), the facsimile calling signal (FC) which is the calling signal from the communication network dedicated to the facsimile communication, the hook-up of the handset or the depression of the ESS key. An operation when the calling signal (CI) arrives is explained.

Since the apparatus has been set in the non-ring call receiving mode before it is set to the ESS stand-by mode, the relays and the control signals related to the non-ringing call reception keep the states prior to the ESS stand-by. Accordingly, the switching relay 20 of the NCU 9 is connected to the calling signal generator 21 (A). The power supply remove signal is off and the quasi calling signal output is high. The calling signal generator 21 outputs +24V DC voltage. Under such control, the bell of the automatic answer/record telephone set is not rung by the reception of the calling signal, even in the ESS standby mode and the non-ringing call signal receiving mode. The +24V DC voltage may be applied to the automatic answer/record telephone set 12 and the current flowing in the telephone set when the handset is hooked up may be detected by the off-hook detection circuit 19.

When the calling signal (CI) arrives from the telephone line 10 of the NCU 9, the waveform of the calling signal is detected by the CI detector 22 of the NCU 9 is reshaped to a TTL level which can be inputted to the CPU 1. The CI signal converted to the TTL level is input to the NMI (non-maskable interrupt) of the CPU 1 (S111).

The CPU 1 is activated when the NMI to return from the inactive state is issued and starts the execution of the program from the next STOP command.

When the CPU 1 is activated, a reverse procedure to that for the shift to the ESS stand-by is conducted. The peripheral ICs of the CPU 1 and the modem are released from the sleep mode. The oscillation circuits other than the system clock are activated (S112). The power supplies shut down by the power supply remote (S113) are outputted (S114).

On the other hand, since the CPU 1 does not recognize the specific activation factor when it is activated by the NMI interruption, it senses the input port of the CPU 1 to check the activation factor. It then determines that it is likely due to the arrival of the calling signal, measures the frequency and the interval of the CI signal, and if they are predetermined values, it determines that it is the arrival of the calling signal (Y in S115). If it is determined as the arrival of the calling signal, it switches the CML relay 17 of the NCU 9 to the modem (B) (S116). The CNG signal is detected and if the CNG signal is not detected within a predetermined time period (N in S117), a telephone call is made. If the CNG signal is detected within the predetermined time period (T in S117), the facsimile receive mode is started (S118). In the facsimile receive mode, the image is received by the modem 8 (S118). After the completion of the image reception, the process returns to S100. If the activation factor does not occur for a predetermined time period (N in S103), the apparatus shifts to the ESS mode.

If the CNG signal is not detected within the predetermined time period (N in S117), the quasi calling is made (S119), and if the off-hook is detected (S120), the relay 20 is switched to the line (B) (S121) and the CML relay 17 is switched to the telephone set (A) (S122) to set the telephone mode (S123).

In the first embodiment described above, the automatic answer/record telephone set is set to the non-ringing mode. By providing a relay similar to the relay 20 in the main unit telephone set 11, the main unit telephone set 11 may also be set to the non-ringing mode.

In the first embodiment, in the non-ringing call receiving mode in the ESS mode, the CPU 1 turns off the main power supply output, keeps the relay 20 active by the stand-by power supply, connects the telephone set to the off-hook detector power supply 5, detects the off-hook by using the off-hook detector power supply 5 and the calling signal is received when it arrives without ringing the telephone set.

In a prior art apparatus in which the ESS mode is implemented by simply stopping the clock of the system, the entire system is reset when the system clock is activated so that the output port of the CPU 1 is reset, the relay 20 is turned off and the telephone set 12 is rung when the calling signal arrives. In the first embodiment, in order to solve the above problems, the hold circuit is provided to prevent the state of the output port from being changed when the apparatus is shifted from the normal stand-by mode to the ESS mode or from the ESS mode to the normal stand-by mode. By the provision of the hold circuit, the state of the port does not change when the apparatus is shifted from the normal stand-by mode to the ESS mode and the state in the normal stand-by mode may be kept.

The power supply 5 may control the on/off of the output by the CPU 1. In the ESS mode, the power supply to other than the CPU peripheral circuits is turned off. On the other hand, the quasi calling signal generator is built in the power supply 5, and in the remote off of the ESS mode, the quasi calling signal outputs the predetermined DC voltage. In the non-ringing call receiving mode in the ESS mode, the off-hook is detected by using the DC voltage.

When the remote is on, that is, when the system is active, for example, in the normal stand-by mode, the quasi calling signal generator outputs +24V if the quasi calling control signal is high and −150V if it is low. When the remote is off or in the ESS stand-by mode, the quasi calling signal generator outputs +24V if the quasi calling control signal is high and 0V if it is low. In the ESS mode, no dangerous voltage is outputted.

In the first embodiment, when the apparatus is set to the non-ringing call receiving mode in the ESS mode, the on state of the relay 20 is held by the sub-power supply so that the perfect non-ringing state may be realized at the arrival of the call. On the other hand, since the on state of the relay 20 is held in the ESS mode, the power consumption in the stand-by mode slightly increases compared with the conventional ESS mode.

In a second embodiment, a low ringing call receiving mode in which the power consumption in the stand-by mode is comparable to that of the conventional ESS mode although the bell of the telephone set is not perfectly non-ringing at the arrival of the call is used.

In the second embodiment, as shown in FIG. 2, a semi-conductor switch 50 for turning on and off the power (PS) supplied from the power supply 5 to the relay 20 by a control signal from the CPU 1 is provided, and an operator may select by a switch (not shown) on the console panel 51, the non-ringing call receiving mode described in the first embodiment or the low ringing call receiving mode to be described below.

FIG. 7A shows a timing chart of an operation at the arrival of the call in the normal ringing call receiving mode and FIG. 7B shows a timing chart of an operation at the arrival of the call in the low ringing call receiving mode.

In the normal ringing call receiving mode, when the CI signal arrives from the line 10 and a second occurring CI signal is detected, it is determined as the detection of the CI signal and the CPU 1 turns on the main power of the power supply 5. Since the semiconductor switch 50 is off, the relay 20 is in the off state and the telephone set 12 is rung by the CI signal until the main power is turned on and the relay 17 is turned on (to connect the line 10 to the modem 20).

On the other hand, in the low ringing call receiving mode, the semiconductor switch 50 is off and the relay 20 is in the off state in the ESS mode. The sleep mode of the CPU 1 is released by the integration signal (detection signal of the CI signal component) from the CI detector 22, the CPU 1 turns on the main power and then turns on the relay 20. (The telephone set 12 is disconnected from the line.) Thus, the telephone set 12 is rung just instantly by the CI signal. At the detection of the second occurring CI signal, the CPU 1 determines it as the CI detection and turn on the relay 17.

In the low ringing call detection mode, since it is not necessary to hold the relay 20 on during the stand-by mode, the power consumption may be reduced.

FIG. 8 shows a flow chart of a control operation of the CPU 1 in the second embodiment.

First, in the stand-by S1, whether the power saving mode (low ringing call receiving mode) is requested or not is determined. If the power saving mode is requested, the apparatus is set to the power saving mode in S2.

Then, in S3, whether the low ringing call receiving mode is requested or not is determined. If the low ringing call receiving mode is requested, the non-ringing call receiving mode is prioritized in S4 although the power saving mode is requested and the non-ringing call receiving mode described in the first embodiment is set. In S5, the switch 50 is turned on so that the drive voltage is applied to the relay 20 by the stand-by power supply in the stand-by mode. Then, the relay 20 is turned on by the CPU 1 and in S6, the telephone set is switched from the line to the facsimile power supply to release the telephone set. In S7, the apparatus is set to the stand-by mode.

If the non-ringing call receiving mode is not requested in S3, the non-ringing call receiving mode is rendered invalid in S8 and the power saving mode is prioritized. In S9, switch 50 is kept off, in S10, the telephone set is kept connected to the line, and in S11, the stand-by mode is set so that the sequence for call arrival is executed in the low ringing call receiving mode.

In accordance with the second embodiment, either the power saving mode or the non-ringing call receiving mode may be prioritized and the user may select the setting depending on the particular environment of the apparatus. Accordingly, in the power saving mode, whether (1) the power saving mode is prioritized and the non-ringing call receiving mode is inhibited or (2) the non-ringing call receiving mode is prioritized while taking the quiet automatic reception in the right into account although the power consumption increases due to the drive of the H relay may be selected and a convenient apparatus is provided.

The present invention is not limited to the illustrated embodiments but various modifications thereof may be made.

What is claimed is:

1. A communication apparatus having a non-ringing call receiving mode in which one of data communication and telephone communication is automatically detected without ringing a telephone set connected to a telephone set connecting terminal when a call arrives and an energy saving stand-by (ESS) mode for reducing power consumption during a stand-by state, comprising:

switching means for connecting/disconnecting the telephone set to/from a telephone line;

quasi-calling signal generating means for ringing the telephone set when the telephone communication in the non-ringing call receiving mode is detected;

control means, having at least an output port to output a control signal for controlling said switching means, for controlling an operation of said switching means by outputting the control signal to said switching means, wherein the telephone set is disconnected from the telephone line in the non-ringing call receiving mode, and wherein, when the ESS mode is set, a power supply supplying power to said control means is turned off in the stand-by state; and holding means for holding a state of the control signal from the output port of said control means to said switching means when the power supply to said control means is turned off.

2. A communication apparatus according to claim 1, wherein a power supply supplying power to said holding means is maintained during the stand-by state in the ESS mode.

3. A communication apparatus having a non-ringing call receiving mode in which one of data communication and telephone communication is automatically detected without ringing a telephone set connected to a telephone set connecting terminal when a call arrives, and an energy saving stand-by (ESS) mode for reducing power consumption during a stand-by state, comprising:

switching means for connecting/disconnecting the telephone set to/from the line;

control means, having at least an output port to output a control signal for controlling said switching means, for controlling an operation of said switching means by outputting the control signal to said switching means, wherein the telephone set is disconnected from the line in the non-ringing call receiving mode;

a power supply controllable by said control means and including a main power supply and a stand-by power supply, wherein, when the ESS mode is set, supply of power to said control means is turned off in the stand-by state; and holding means for holding a state of the control signal from the output port of said control means to said switching means when the power supply to said control means is turned off.

4. A communication apparatus according to claim 3, wherein a power supply supplying power to said holding means is maintained on the stand-by power supply during the stand-by state in the ESS mode.

5. A communication apparatus having a non-ringing call receiving mode in which one of data communication and telephone communication is automatically detected without ringing a telephone set connected to a telephone set connecting terminal when a call arrives, and an energy saving stand-by (ESS) mode for reducing power consumption during a stand-by state, comprising:

first switching means for switching connection to a line between the telephone set and the communication apparatus;

second switching means arranged between said first switching means and the telephone set for connecting/disconnecting the telephone set to/from the line;

detection means for detecting a calling signal from the line;

control means, having at least an output port to output a control signal for controlling said switching means, for controlling an operation of said switching means by outputting the control signal to said switching means, wherein the telephone set is disconnected from the line in a first non-ringing call receiving mode, wherein, in a second non-ringing call receiving mode, the telephone set is connected to the line in a stand-by state and then is immediately disconnected from the line in response to a detection by said detection means so that the telephone set is slightly rung on the calling signal from the line, and wherein, when the ESS mode is set, a power supply supplying power to said control means is turned off in the stand-by state;

holding means for holding a state of the control signal from the output port of said control means to said switching means when the power supply to said control means is turned off; and selection means for selecting the first or second non-ringing call receiving mode.

6. A communication apparatus according to claim 5, wherein a power supply supplying power to said holding means is maintained during the stand-by state in the ESS mode.

7. A communication apparatus having a non-ringing call receiving mode in which one of data communication and telephone communication is automatically detected without ringing a telephone set connected to a telephone set connecting terminal when a call arrives, comprising:

first switching means for switching connection to a line between the telephone set and the communication apparatus;

second switching means arranged between said first switching means and the telephone set for connecting/disconnecting the telephone set to/from the line;

detection means for detecting a calling signal from the line;

control means, having at least an output port to output a control signal for controlling said switching means, for controlling an operation of said switching means by outputting the control signal to said switching means, wherein the telephone set is disconnected from the line in a first non-ringing call receiving mode, wherein, in a second non-ringing call receiving mode, the telephone set is connected to the line in a stand-by state and then is immediately disconnected from the line in response to a detection by said detection means so that the telephone set is rung momentarily on the calling signal from the line;

holding means for holding a state of the control signal from the output port of said control means to said switching means when the power supply to said control means is turned off; and selection means for selecting the first or second non-ringing call receiving mode.

8. A communication apparatus according to claim 7, wherein a power supply supplying power to said control means is turned off in the stand-by state in an energy saving stand-by (ESS) mode for reducing power consumption during the stand-by state.

9. A communication apparatus according to claim 8, wherein a power supply supplying power to said holding means is maintained during the stand-by state in the ESS mode.

* * * * *